No. 700,742. Patented May 27, 1902.
F. P. CROFT.
BOX OR PACKAGE.
(Application filed Mar. 15, 1902.)
(No Model.)
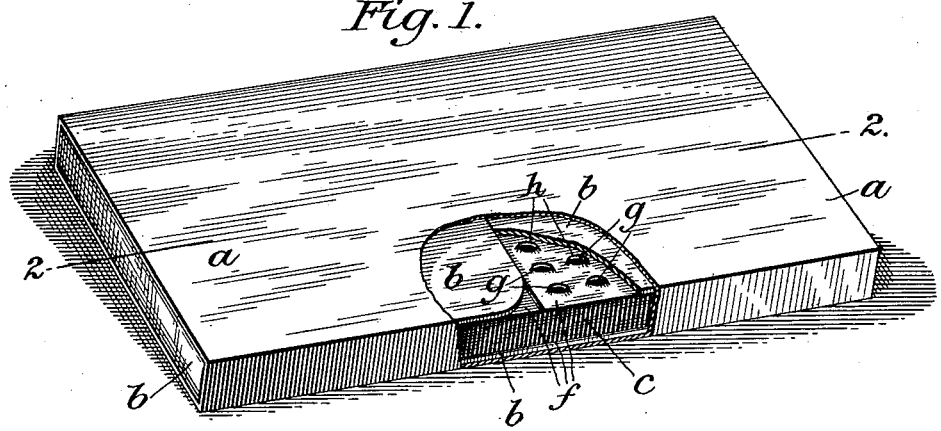
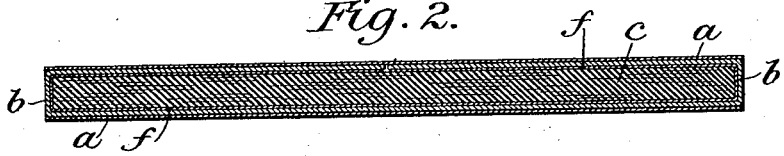
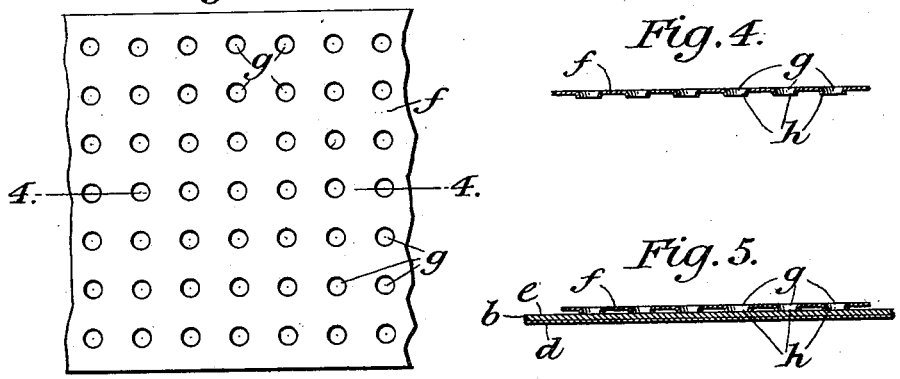
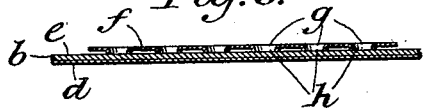
Attest:
A. N. Jesbera.
J. M. Scoble.
Inventor.
Frank P. Croft
by Redding, Kiddle & Greeley
Attys.
THE NORRIS PETERS CO., PHOTO-LITHO., WASHINGTON, D. C.

UNITED STATES PATENT OFFICE.

FRANK P. CROFT, OF MERION, PENNSYLVANIA.

BOX OR PACKAGE.

SPECIFICATION forming part of Letters Patent No. 700,742, dated May 27, 1902.

Application filed March 15, 1902. Serial No. 98,275. (No model.)

*To all whom it may concern:*

Be it known that I, FRANK P. CROFT, a citizen of the United States, residing in Merion, Montgomery county, Pennsylvania, have invented certain new and useful Improvements in Boxes or Packages, of which the following is a specification, reference being had to the accompanying drawings, forming a part hereof.

This invention relates particularly to boxes, packages, or wrappers which are intended to be employed for the inclosing of substances from which oily or liquid matters are liable to exude under some conditions, and is particularly designed with reference to the inclosing of cake-chocolate from which in a warm atmosphere the cocoa-butter which is necessarily used sometimes exudes to some extent. It is desirable that such cocoa-butter should be absorbed as it is separated, even in small quantity, and it is also desirable that the chocolate should be kept from contact with any absorbent material which may be employed in the wrapper, lest fibers of the absorbent material should adhere to the chocolate, and thereby affect the appearance of the cake and its salability.

It is therefore the object of this invention to provide a wrapper in which provision shall be made for absorbing the cocoa-butter, while at the same time the cake of chocolate is kept from actual contact with the absorbent material.

In accordance with the invention material which offers no loose fibers for adhesion to the chocolate and which may have little or no absorptive capacity, having perforations or interstices for the passages of the cocoa-butter, is interposed between the chocolate and the absorbent material, which necessarily offers fibers which might adhere to the chocolate if contact between the two were permitted.

The invention will be more fully described hereinafter with reference to the accompanying drawings, in which for purposes of explanation it is represented as embodied in a convenient and practical form.

In the drawings, Figure 1 is a view in perspective of a box or package to which the present improvement is applied, the same being partly broken out to show details of construction. Fig. 2 is a longitudinal section on the plane indicated by the line 2 2 of Fig. 1. Fig. 3 is an exaggerated view of a small portion of the material interposed between the chocolate and the absorbent material. Fig. 5 is a section on the plane indicated by the line 4 4 of Fig. 4. Fig. 5 is a similar view illustrating in an exaggerated manner the relation of the material shown in Fig. 4 to the absorbent material.

It will be evident that the package, box, or wrapper may be made up in any convenient or desired manner. As represented in Figs. 1 and 2 of the drawings, an outer shell or case *a*, having open ends, may be provided, the same being formed in this instance of any desired material suitable for an outer wrapper. Within this is an inner wrapper *b*, which is here shown as lapped endwise about the cake of chocolate or other material to be inclosed, which is indicated at *c*. This inner wrapper *b* either covers or embodies the absorbent material. As represented in the drawings, it is a compound sheet having an outer surface or layer *d*, of hard or glazed paper, and an inner surface or layer *e*, of absorbent material, such as blotting-paper, the several surfaces or layers being clearly indicated in Fig. 5. The purpose of the blotting-paper or other absorbent material is to take up immediately such cocoa-butter or oily matter as may be separated from the chocolate or such other oily matter or liquid matter as may be separated from the commodity which is inclosed. It is obvious, however, that the fibers of the blotting-paper might adhere to the commodity under some circumstances if contact between the two were permitted and that such adhering fibers might affect the appearance and so injure the reputation of the goods in the market. For this reason it is desirable to prevent direct contact between the absorbent material and the commodity without interfering materially with the absorption of the oily or liquid matters which may be separated from the commodity. To this end, therefore, there is interposed between the absorbent material and the commodity another material which is of such a character as to permit the passage of the cocoa-butter or other separated oil or liquid therethrough, while it does not offer loose or readily-disengaged fibers for adhesion to the commodity. Preferably a separate sheet f, of paraffin-paper, is employed for this purpose, the same being provided with numerous small openings or perforations g, through which the separated oil or other liquid may readily pass to be taken up by the absorbent material, while direct contact between such absorbent material and the chocolate or other substance is prevented. The perforations may be formed advantageously by such means or in such manner that their edges will be struck up slightly, as clearly indicated in Figs. 4 and 5, thereby better insuring non-contact between the chocolate or other substance and the absorbent material.

It will be evident that the improvement may be embodied in different forms, as may be best suited to the commodity or to the requirements of the trade, without departing from the spirit of the invention.

I claim as my invention—

1. A wrapper for chocolate and other commodities, the same comprising a sheet of absorbent material and a sheet of perforated paraffin-paper interposed between the commodity and the sheet of absorbent material, substantially as described.

2. A wrapper for chocolate and other commodities, the same comprising a compound sheet having an outer hard or glazed surface and an inner absorbent surface and a sheet of perforated paraffin-paper interposed between the commodity and the absorbent surface of the compound sheet, substantially as described.

This specification signed and witnessed this 11th day of March, A. D. 1902.

FRANK P. CROFT.

In presence of—
W. B. GREELEY,
I. O. KERBAUGH.